G. A. MEYER.
DIPPING TANK.
APPLICATION FILED NOV. 21, 1910.
1,023,387.
Patented Apr. 16, 1912.
4 SHEETS—SHEET 1.
Fig. 1
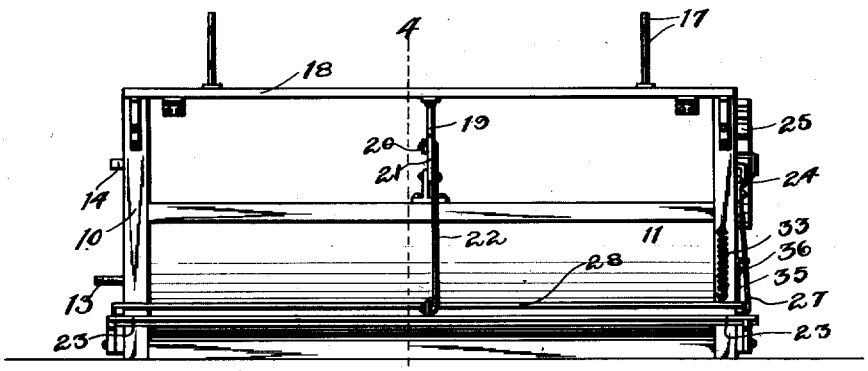
Fig. 2
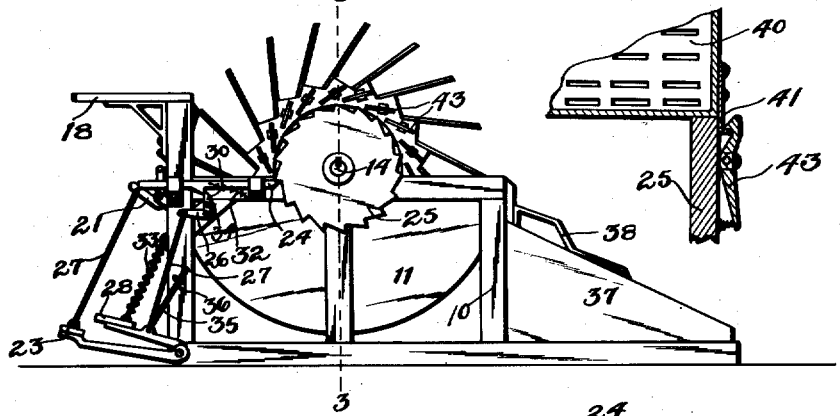
Fig. 7
Fig. 8
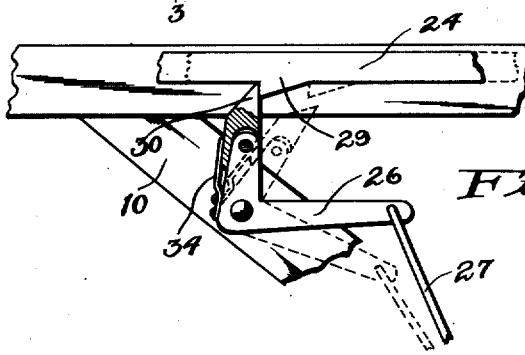
Witnesses
F. C. Caswell
K. H. Hansen
Inventor
George A. Meyer
by John E. Stryker Atty.

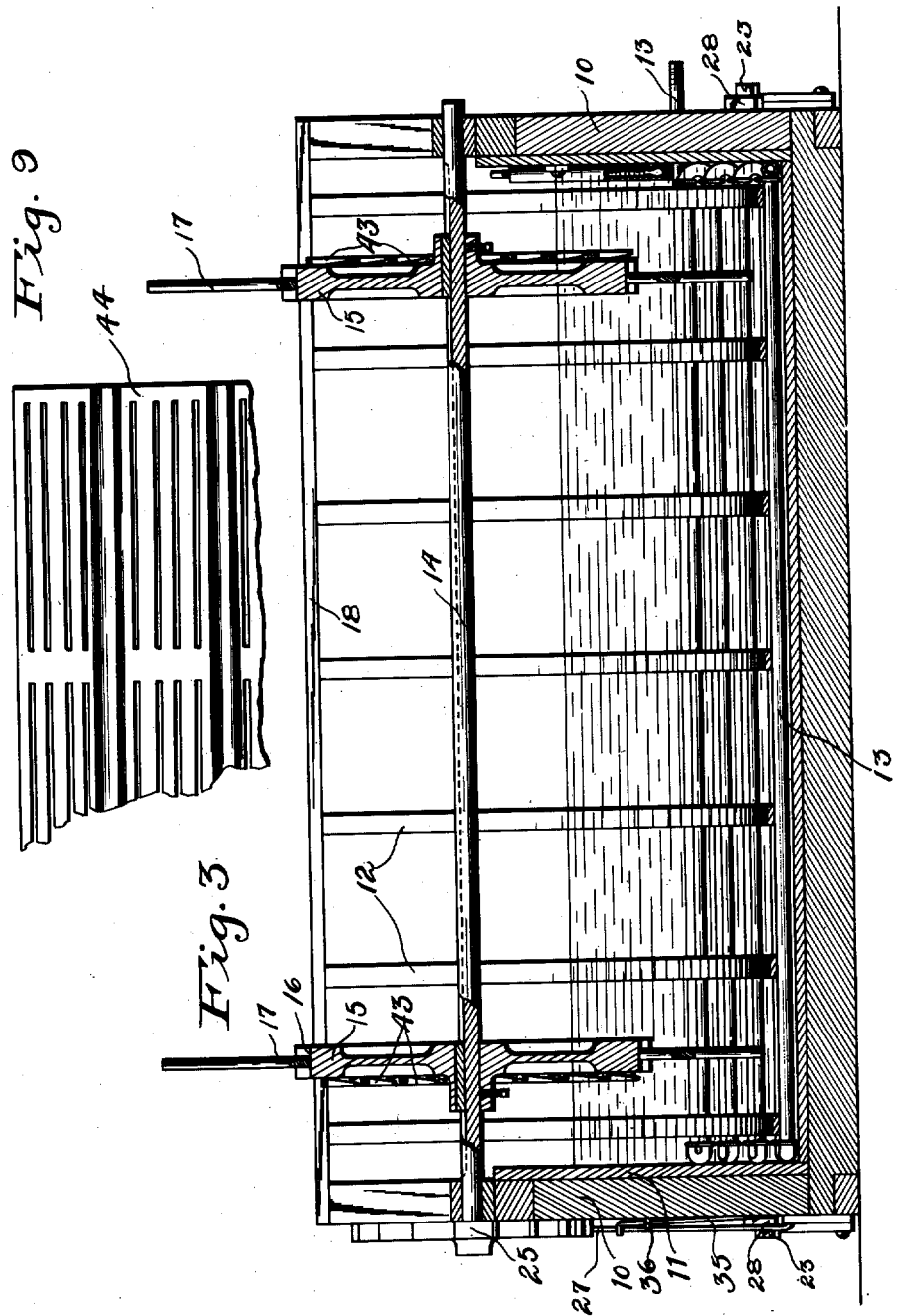

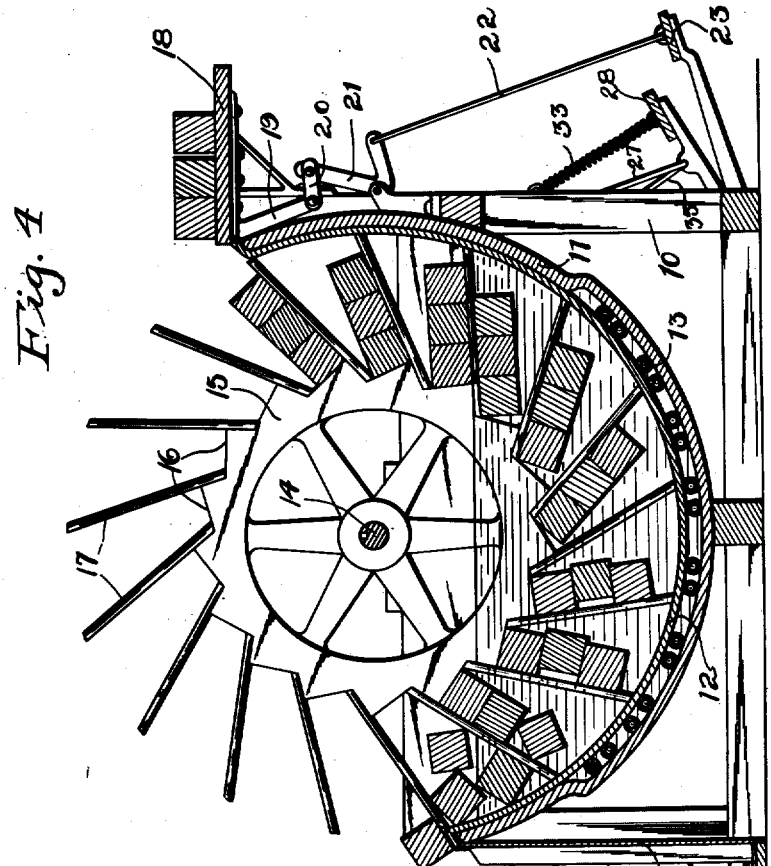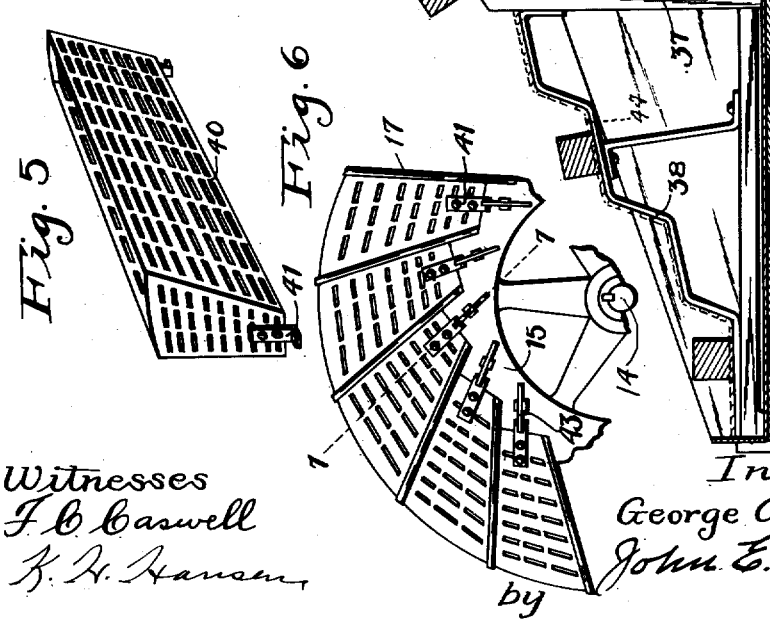

G. A. MEYER.
DIPPING TANK.
APPLICATION FILED NOV. 21, 1910.
1,023,387.
Patented Apr. 16, 1912.
4 SHEETS—SHEET 4.
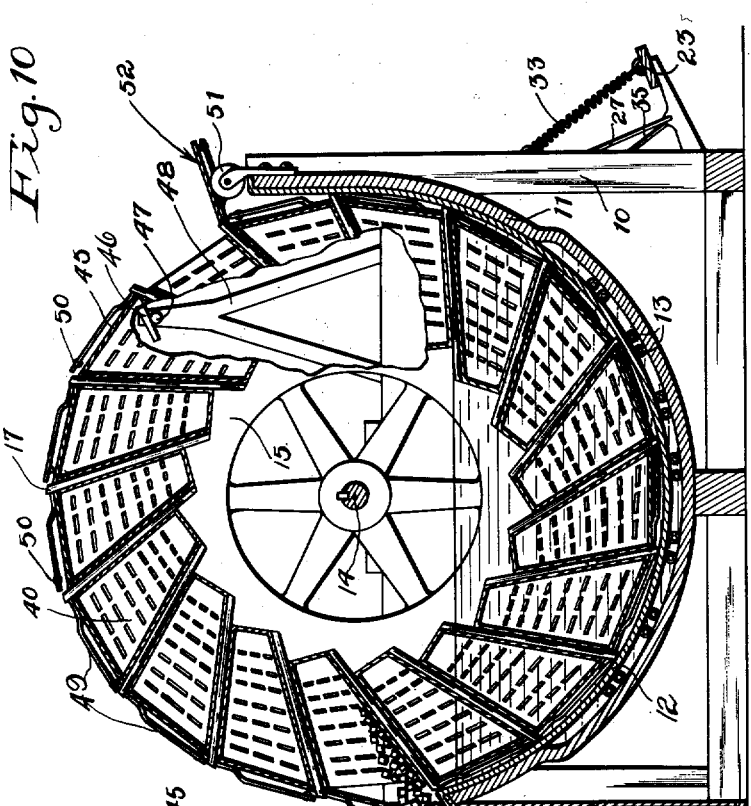
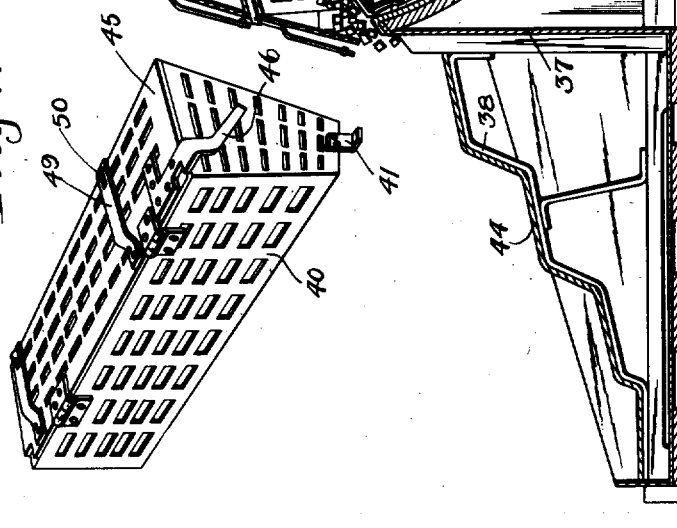
Witnesses
F. C. Caswell
K. H. Hansen
Inventor
George A. Meyer
by John E. Stryker Atty.

UNITED STATES PATENT OFFICE.

GEORGE A. MEYER, OF ST. PAUL, MINNESOTA.

DIPPING-TANK.

1,023,387.   Specification of Letters Patent.   Patented Apr. 16, 1912.

Application filed November 21, 1910. Serial No. 593,363.

*To all whom it may concern:*

Be it known that I, GEORGE A. MEYER, a citizen of the United States, residing at St. Paul, in the county of Ramsey and State of Minnesota, have invented new and useful Improvements in Dipping-Tanks, of which the following is a specification.

My invention relates to improvements in dipping machines.

The primary object of my invention is to provide a machine for dipping cross arms, ties and other articles requiring liquid treatment, either for the purpose of impregnating or coating them.

A further object of my invention is to provide a machine of this type so arranged that the weight and buoyancy of the product immersed furnishes power to assist in operating the machine.

A further object of my invention is to provide a machine of this type for dipping articles of different sizes and shapes into a suitable bath, for delivering the same from the bath, and for removing the surplus liquid from the product.

A further object of my invention is to provide a machine of this type capable of being operated easily and efficiently and with a minimum of attendants.

Figure 1 shows a side elevation of my improved dipping machine; Fig. 2 shows an end elevation of the same; Fig. 3 shows a sectional view taken on the line 3—3 of Fig. 2; Fig. 4 shows a sectional view taken on the line 4—4 of Fig. 1; Fig. 5 shows a detail of one of the perforated baskets used in dipping small objects; Fig. 6 shows said baskets in operative positions; Fig. 7 shows a detail sectional view taken on the line 7—7 of Fig. 6; Fig. 8 shows a detail view of the spring actuated dog for operating the device for governing the movement of the rotatable support. Fig. 9 shows a part of the perforated drainage platform in detail; Fig. 10 shows a sectional view of a modified form of my dipping tank for treating small objects of metal and other non-buoyant material; Fig. 11 shows a detail perspective view of one of the baskets used in my modified dipping tank.

Referring to the accompanying drawings, I have used the reference numeral 10 to indicate the frame upon which the semi-cylindrical tank 11 is mounted. The transverse guide bars 12 spaced apart in the tank 11 (shown in Figs. 3 and 4) prevent the possible clogging of products in the longitudinally arranged steam heating pipes 13. The shaft 14 extending through the center of the tank 11 is rotatably mounted near its ends on the frame 10. Two wheels 15 with serrated peripheries to form seats 16 are feathered on the shaft 14, and on said wheels are mounted the supporting arms 17, which extend in directions approximately tangent to said wheels. The wheels 15 are parallel and their arms 17 are similarly arranged so that corresponding arms on each wheel form pairs to furnish a rotatable support which receives, dips, and delivers products passing through the tank 11.

The loading platform 18 is hinged to the frame 10 adjacent to the tank 11 to form a tilting support for the products to be treated. The lever 19 on the platform 18 is connected by the link 20 to the bell crank 21 which is mounted on the frame 10. Said bell crank is operatively connected by the rod 22 to the treadle 23 on the frame 10, and through said connections as shown in Fig. 4 tilts the loading platform 18 to transfer the product to a pair of arms 17, which by the revolution of the wheels 15 are brought into alinement with the platform. The weight of the product rotates the arms 18 in a clock-wise direction as seen in Fig. 4, and to govern the rotation of said arms, I have arranged the pawl 24, slidably mounted on the frame 10, to engage the ratchet wheel 25, which is keyed to the shaft 14. The bell crank 26 pivotally mounted on the frame 10 is connected by the rod 27 to the treadle 28 on the frame, and engages the lug 29 on the pawl 24, to disengage said pawl from the ratchet wheel 25. The arms 17 are free to rotate when the pawl 24 is disengaged from said ratchet wheel, and are prevented from passing the position where they receive the products from the loading platform 18, by the following described mechanism. The bell crank 26 is jointed at one end to form a dog 30 capable of pivotal movement only in one direction and is so arranged that said dog engages the lug 29 on the pawl 24 to disengage said pawl from the ratchet wheel 25, as the treadle 28 is pushed downwardly.

In operating, the end of the dog 30 describes an arc, and releases the pawl 24, as shown in Fig. 8. The spring 32 connected at one end to the frame and at the other to the pawl 24, returns the same to its normal position where it again engages the ratchet wheel 25. The return action of the pawl 24 is very rapid, and allows only one pair of arms to pass the position for loading. The spring 33 in connection with the treadle 28 and frame 10, returns the bell crank 26 to its normal operative position, the beveled side of the dog 30 strikes the lug 29 on the pawl 24, and turns on its pivot against the action of the spring 34 until it passes said lug, when it is again returned by said spring to its normal position. The stop rod 35 pivotally connected to the treadle 28 at one end and slidably mounted through the staple 36 on the frame 10 at the other, limits the unnecessary downward movement of the treadle 28. The drainage receptacle 37 is located adjacent to the tank 10 on the opposite side from the loading platform, and on it is mounted a drainage platform 38 comprising a series of step-like bars, which receive and jar the surplus liquid from the product as it rolls from the arms 17 to the drainage receptacle 37. To provide means for impregnating objects too small to be practically carried by the arms 17, I use a number of perforated dipping baskets 40 designed to fit between the arms 17, each being provided with flanged lugs 41, which when in position are engaged and secured by the spring actuated catches 43, on the wheels 15. I also use a perforated drainage platform 44 in connection with the perforated baskets, which conforms with and rests on the drainage platform 38, as shown in dotted lines, Fig. 4.

In the practical operation of my machine, cross arms or other products are placed on the platform 18, and are transferred to a pair of supporting arms 17 by operating the treadle 23 which tilts the platform 18. The treadle 28 is then operated to free the rotatable support which turns by the weight of the product in the supporting arms, thus placing the next pair of arms in position to receive a load from the platform 18. Assuming that the arms are loaded to their full capacity, articles which have been immersed and have reached the side of the tank opposite to that on which they were immersed will be thrown out on the drainage platform by the pair of arms following those on which they were first placed. The above operations are repeated, the article being passed through the liquid contained in the tank, and delivered to the drainage platform 38 over the drainage receptacle 37 where the surplus liquid is shaken and drained from the product. Assuming that the loads delivered from the platform 18 are equal, the combined weight of the article on the feeding side of the tank will overcome the buoyancy of the immersed article on that side and rotate the support until the first of said articles shall have passed the center of the support, when their buoyancy under the arms in the opposite side will assist in rotating the support. The perforated dipping baskets 40 are mounted on the wheels 15 and the perforated platform 44 is affixed to the platform 38 when it is desired to treat small objects. The operation, when said perforated baskets and platform are in use, is the same as above described.

In the modified form of my device, I have provided for dipping small objects of greater specific gravity than the liquid. The lids 45 of the baskets when open form hinged loading platforms. On each of said basket lids is a trip bar 46 as shown in Figs. 10 and 11 of the drawings. A horizontally arranged lug 47 is mounted in the path of the trip bars 46 on the bracket 48 which is supported on the frame 10. The spring bars 49 are mounted on the hinged sides of the lids 45 and are provided at their ends with rollers 50 adapted to engage the guide bars 12, and yieldingly hold the lids 45 in closed positions as they travel through the tank. The rollers 51 mounted on the main frame 10 support the lids 45 in their open position when they form loading platforms for their respective baskets.

The operation of my modified form of dipping machine is as follows: Assuming one of the lids 45 to be open as shown at 52 in Fig. 10 of the drawings, articles to be treated are first placed upon said lid, the treadle 23 is then operated as above described, and the support is turned to rotate the baskets 40. During said rotation, the rollers 51 close the lid 45 of a filled basket, and the lug 47 opens the lid of the next succeeding basket by engaging the trip bar 46, said lid falling outwardly and being supported by the rollers 51. As the operations are repeated and the rollers 50 pass from engagement with the bars 12, the lids 45 are released and are opened by the weight of the treated articles which fall to the perforated drainage platform where the surplus liquid is drained therefrom. The loading point being higher than the discharging point, a greater number of baskets are on the loading side of the rotatable support, and furnish power for operating the same.

Having described my invention, what I claim as new and desire to protect by Letters Patent is:

1. In a dipping machine, the combination of a tank, a support rotatably mounted in the tank and comprising a plurality of members having a common axis and a plurality of arms carried by each of said members, said arms extending obliquely upward on one side for loading and downward on the other side for unloading.

2. In a dipping machine the combination of a tank, a rotatable support comprising a plurality of members having a common axis within the tank, said members being capable of lateral adjustment on said axis, a plurality of obliquely arranged arms carried by said members and a drainage receptacle adjacent to the tank and adapted to retain the drip from the treated articles.

3. In a dipping machine, a tank, an adjustable support rotatably mounted in said tank, a plurality of obliquely arranged arms carried by said support, and a loading platform mounted on the tank, said platform being adapted to tilt upward when loading said arms.

4. In a dipping machine a tank and a rotatable support comprising a plurality of adjustable support members mounted in the tank, obliquely arranged arms on said members, said support being adapted to receive, dip and discharge the product while retaining a greater weight of the same on one side of the axis of the support than on the other to rotate the same by gravity.

5. In a dipping machine, the combination of a tank, an adjustable support rotatably mounted in said tank, a plurality of obliquely arranged arms on said support carried in pairs, and means for releasing and retarding the support to present the arms in suitable position for loading.

6. In a dipping machine, a tank, a loading platform hinged on said tank, an adjustable support rotatably mounted in said tank, a plurality of arms on said support extending obliquely upward from the center when adjacent to the loading platform and manually operated means for tilting said platform to transfer products therefrom to said arms.

7. In a dipping machine, a tank, a drainage receptacle adjacent to the tank, an adjustable support rotatably mounted in the tank, arms on said support extending obliquely downward from the center when adjacent to the drainage receptacle, and a drainage platform in said receptacle to support the product above said receptacle.

8. In a dipping machine, a tank for cross arms and similar products adapted to contain liquid, steam pipes in the tank for heating the liquid, an adjustable support rotatably mounted in the tank for said cross arms, a loading platform on the tank and a drainage platform in said receptacle comprising a series of steplike bars, a drainage receptacle adjacent to and on the opposite side of said tank adapted to receive the treated products and jar the drip therefrom.

9. In a dipping machine, a tank for cross arms or similar products, a shaft rotatably mounted in the tank, wheels with serrated peripheries on said shaft to form seats for the cross arms, arms carried by said wheels, a loading platform adjacent to the tank for loading said arms, a drainage receptacle for retaining the drip from said product and a drainage platform to receive said products and support them in a position above the drip.

10. In a dipping machine for cross arms or similar products, a tank, a shaft rotatably mounted in the tank, wheels slidably mounted on the shaft, arms substantially tangent to said wheels and mounted thereon, a loading platform adjacent to the tank, a treadle operatively connected thereto for tilting the same, a ratchet wheel on the shaft, a pawl in operative engagement with said ratchet wheel, and means for operating said pawl.

11. In a dipping machine, a tank, a shaft rotatably mounted in the tank, wheels slidably mounted on said shaft, arms substantially tangent to said wheels and mounted thereon, a ratchet wheel on said shaft, a pawl in operative engagement with said ratchet wheel, an operating treadle operatively connected to the pawl, a loading platform adjacent to one side of the tank, and a drainage receptacle adjacent to the opposite side of the tank.

12. In a dipping machine, a tank, a shaft rotatably mounted in the tank, wheels slidably mounted on said shaft, arms substantially tangent to said wheels and mounted thereon, a ratchet wheel on said shaft, a pawl in operative engagement with said ratchet wheel, an operating treadle operatively connected to the pawl, a loading platform adjacent to one side of the tank, a drainage receptacle adjacent to the opposite side of the tank, and a drainage platform in said receptacle.

13. In a dipping machine for cross arms or other products, a frame, a tank on the frame, a longitudinal shaft rotatably mounted in the tank, wheels with serrated peripheries feathered to said shaft, arms substantially tangent to said wheels and mounted thereon, a ratchet wheel on said shaft, a spring-actuated pawl engaging said ratchet wheel, a lug on said pawl, a bell crank on the frame, a spring-actuated dog on the bell crank to engage said lug for operating the pawl in one direction of its movement, a treadle on the frame, connected to said bell crank, a spring for returning said treadle and dog to operative positions, a hinged loading platform on the frame, a lever on said platform, a second treadle on the frame, a bell crank on the frame operatively connected to said lever, and second mentioned treadle for tilting the loading platform, a drainage receptacle adjacent to the tank, and a drainage platform comprising a series of step-like bars in said tank.

14. In a dipping machine for cross arms or other products, a frame, a tank on the frame, a longitudinal shaft rotatably mounted in the tank, wheels with serrated peripheries feathered to said shaft, arms substantially tangent to said wheels and mounted thereon, a ratchet wheel on said shaft, a spring-actuated pawl engaging said ratchet wheel, a lug on said pawl, a bell crank on the frame, a spring-actuated dog on the bell crank to engage said lug for operating the pawl in one direction of its movement, a treadle on the frame, connected to said bell crank, a spring for returning said treadle and dog to operative positions, a hinged loading platform on the frame, a lever on said platform, a second treadle on the frame, a bell crank on the frame operatively connected to said lever, and second mentioned treadle for tilting the loading platform, a drainage receptacle adjacent to the tank, a drainage platform comprising a series of step-like bars in said tank, perforated baskets carried by said wheels and arms, and a perforated drainage platform in said receptacle.

15. In a dipping machine, a tank, a rotatable support in the tank and detachable perforated baskets carried by said support, said baskets being adapted to receive, dip and discharge articles while retaining a greater weight of the same on one side of the axis of the support than on the other to rotate said support by gravity.

16. In a dipping machine, a tank adapted to hold liquid, a rotatable support in the tank, perforated baskets carried by said supports, lids on said baskets adapted to form loading platforms therefor, means for releasing and retarding said support to present said baskets one at a time in position for loading, and a perforated drainage platform adjacent to the opposite side of said tank for receiving the treated product.

17. In a dipping machine, a tank, a rotatable support in the tank, a plurality of perforated baskets removably attached to said support, hinged lids on said baskets, forming loading platforms therefor, a drainage platform to receive treated products from said baskets and a drainage receptacle for retaining the drip from the product.

18. In a dipping machine, a tank, adapted to hold liquid, steam pipes in the tank to heat said liquid, a rotatable support in the tank, a plurality of perforated baskets removably attached to said support, lids on said baskets adapted to form loading platforms therefor, means for automatically opening said lids and a drainage receptacle adjacent to the tank adapted to receive the treated products from said baskets.

19. In a dipping machine, a tank adapted to hold liquid, a rotatable support in said tank, perforated baskets provided with hinged lids carried by said support, said lids forming loading platforms for said baskets, which are adapted to travel in a path, partly in and partly out of the liquid, and means for securing the lids of said baskets in closed positions when in the tank.

20. In a dipping machine, a tank with guide bars therein, a rotatable support in said tank, perforated baskets provided with hinged lids carried by said support, a lug on the tank, trip bars on said lids to engage said lug and open said lids, springs adapted to hold the lids in closed positions when in the tank, rollers on the springs adapted to engage said guide bars, a drainage receptacle adjacent to said tank and a perforated platform in said receptacle.

21. In a dipping machine, a tank, a rotatable support in said tank, covered baskets detachably mounted in said support, said baskets traveling in a path partly in and partly out of the tank, hinged covers on said baskets adapted to form loading platforms therefor, means for retaining said covers in closed positions when in the tank, and means for thereafter severally opening said covers.

In testimony whereof, I have signed my name to this specification in the presence of two subscribing witnesses.

GEORGE A. MEYER.

Witnesses:
F. C. CASWELL,
JOHN E. STRYKER.

---

It is hereby certified that in Letters Patent No. 1,023,387, granted April 16, 1912, upon the application of George A. Meyer, of St. Paul, Minnesota, for an improvement in "Dipping-Tanks," an error appears in the printed specification requiring correction as follows: Page 3, lines 54–56, strike out the comma and words ", a drainage receptacle adjacent to and on the opposite side of said tank" and insert same after the word "tank", in line 52, same page; and that the said Letters Patent should be read with this correction therein that the same may conform to the record of the case in the Patent Office.

Signed and sealed this 4th day of June, A. D., 1912.

[SEAL.]

C. C. BILLINGS,

*Acting Commissioner of Patents.* tially tangent to said wheels and mounted thereon, a ratchet wheel on said shaft, a spring-actuated pawl engaging said ratchet wheel, a lug on said pawl, a bell crank on the frame, a spring-actuated dog on the bell crank to engage said lug for operating the pawl in one direction of its movement, a treadle on the frame, connected to said bell crank, a spring for returning said treadle and dog to operative positions, a hinged loading platform on the frame, a lever on said platform, a second treadle on the frame, a bell crank on the frame operatively connected to said lever, and second mentioned treadle for tilting the loading platform, a drainage receptacle adjacent to the tank, a drainage platform comprising a series of step-like bars in said tank, perforated baskets carried by said wheels and arms, and a perforated drainage platform in said receptacle.

15. In a dipping machine, a tank, a rotatable support in the tank and detachable perforated baskets carried by said support, said baskets being adapted to receive, dip and discharge articles while retaining a greater weight of the same on one side of the axis of the support than on the other to rotate said support by gravity.

16. In a dipping machine, a tank adapted to hold liquid, a rotatable support in the tank, perforated baskets carried by said supports, lids on said baskets adapted to form loading platforms therefor, means for releasing and retarding said support to present said baskets one at a time in position for loading, and a perforated drainage platform adjacent to the opposite side of said tank for receiving the treated product.

17. In a dipping machine, a tank, a rotatable support in the tank, a plurality of perforated baskets removably attached to said support, hinged lids on said baskets, forming loading platforms therefor, a drainage platform to receive treated products from said baskets and a drainage receptacle for retaining the drip from the product.

18. In a dipping machine, a tank, adapted to hold liquid, steam pipes in the tank to heat said liquid, a rotatable support in the tank, a plurality of perforated baskets removably attached to said support, lids on said baskets adapted to form loading platforms therefor, means for automatically opening said lids and a drainage receptacle adjacent to the tank adapted to receive the treated products from said baskets.

19. In a dipping machine, a tank adapted to hold liquid, a rotatable support in said tank, perforated baskets provided with hinged lids carried by said support, said lids forming loading platforms for said baskets, which are adapted to travel in a path, partly in and partly out of the liquid, and means for securing the lids of said baskets in closed positions when in the tank.

20. In a dipping machine, a tank with guide bars therein, a rotatable support in said tank, perforated baskets provided with hinged lids carried by said support, a lug on the tank, trip bars on said lids to engage said lug and open said lids, springs adapted to hold the lids in closed positions when in the tank, rollers on the springs adapted to engage said guide bars, a drainage receptacle adjacent to said tank and a perforated platform in said receptacle.

21. In a dipping machine, a tank, a rotatable support in said tank, covered baskets detachably mounted in said support, said baskets traveling in a path partly in and partly out of the tank, hinged covers on said baskets adapted to form loading platforms therefor, means for retaining said covers in closed positions when in the tank, and means for thereafter severally opening said covers.

In testimony whereof, I have signed my name to this specification in the presence of two subscribing witnesses.

GEORGE A. MEYER.

Witnesses:
F. C. CASWELL,
JOHN E. STRYKER.

---

It is hereby certified that in Letters Patent No. 1,023,387, granted April 16, 1912, upon the application of George A. Meyer, of St. Paul, Minnesota, for an improvement in "Dipping-Tanks," an error appears in the printed specification requiring correction as follows: Page 3, lines 54–56, strike out the comma and words ", a drainage receptacle adjacent to and on the opposite side of said tank" and insert same after the word "tank", in line 52, same page; and that the said Letters Patent should be read with this correction therein that the same may conform to the record of the case in the Patent Office.

Signed and sealed this 4th day of June, A. D., 1912.

[SEAL.]

C. C. BILLINGS,

*Acting Commissioner of Patents.*

It is hereby certified that in Letters Patent No. 1,023,387, granted April 16, 1912, upon the application of George A. Meyer, of St. Paul, Minnesota, for an improvement in "Dipping-Tanks," an error appears in the printed specification requiring correction as follows: Page 3, lines 54–56, strike out the comma and words ", a drainage receptacle adjacent to and on the opposite side of said tank" and insert same after the word "tank", in line 52, same page; and that the said Letters Patent should be read with this correction therein that the same may conform to the record of the case in the Patent Office.

Signed and sealed this 4th day of June, A. D., 1912.

[SEAL.]

C. C. BILLINGS,
*Acting Commissioner of Patents.*